(12) United States Patent
Suzuki et al.

(10) Patent No.: US 9,823,971 B2
(45) Date of Patent: Nov. 21, 2017

(54) DATA PROCESSING APPARATUS AND DATA PROCESSING METHOD

(71) Applicant: FUJITSU LIMITED, Kawasaki-shi, Kanagawa (JP)

(72) Inventors: Takahisa Suzuki, Yokohama (JP); Koichiro Yamashita, Hachioji (JP); Hiromasa Yamauchi, Usakos (JP); Koji Kurihara, Kawasaki (JP); Toshiya Otomo, Kawasaki (JP); Yuta Teranishi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 540 days.

(21) Appl. No.: 14/496,719

(22) Filed: Sep. 25, 2014

(65) Prior Publication Data
US 2015/0012777 A1    Jan. 8, 2015

Related U.S. Application Data

(63) Continuation of application No. PCT/JP2012/057991, filed on Mar. 27, 2012.

(51) Int. Cl.
*G06F 11/00* (2006.01)
*G06F 11/14* (2006.01)
*G06F 11/07* (2006.01)

(52) U.S. Cl.
CPC ........ *G06F 11/141* (2013.01); *G06F 11/0721* (2013.01); *G06F 11/0793* (2013.01)

(58) Field of Classification Search
CPC ............... G06F 11/141; G06F 11/1441; G06F 11/0721; G06F 11/0751; G06F 11/0793; G06F 11/1407; G06F 11/1471
See application file for complete search history.

(56) References Cited

U.S. PATENT DOCUMENTS

| 4,044,337 A | * | 8/1977 | Hicks | G06F 11/141 714/16 |
| 5,146,569 A | * | 9/1992 | Yamaguchi | G06F 11/141 712/228 |

(Continued)

FOREIGN PATENT DOCUMENTS

| JP | 53-018932 | 2/1978 |
| JP | 60-246441 | 12/1985 |

(Continued)

OTHER PUBLICATIONS

Japanese Office Action dated Oct. 6, 2015 in corresponding Japanese Patent Application No. 2014-507102.

(Continued)

*Primary Examiner* — Michael Maskulinski
(74) *Attorney, Agent, or Firm* — Staas & Halsey LLP

(57) ABSTRACT

A data processing apparatus includes a storage unit configured to store plural data processing programs and a corresponding error processing program for when an error occurs with a first data processing program; and a processor configured to record to memory before executing the first data processing program, information of the error processing program that corresponds to the first data processing program; update and record in the memory after the first data processing program ends, information of a second data processing program scheduled to be executed next; and switch to any one among the first data processing program that corresponds to information recorded in the memory and the error processing program, when program processing is started next.

12 Claims, 14 Drawing Sheets

(56) References Cited

U.S. PATENT DOCUMENTS

| | | | | |
|---|---|---|---|---|
| 6,178,523 | B1* | 1/2001 | Klein | G06F 11/1441 713/340 |
| 6,662,311 | B2* | 12/2003 | Itoh | G06F 1/24 714/15 |
| 2005/0193271 | A1* | 9/2005 | Linam | G06F 9/4812 714/39 |
| 2006/0140168 | A1 | 6/2006 | Ryoo | |
| 2006/0156157 | A1* | 7/2006 | Haselden | G06F 11/0793 714/746 |
| 2010/0313061 | A1* | 12/2010 | Huth | G06F 11/073 714/2 |
| 2011/0099544 | A1 | 4/2011 | Haramiishi et al. | |
| 2014/0115389 | A1* | 4/2014 | Fan | G06F 11/073 714/15 |
| 2015/0205661 | A1* | 7/2015 | Kaus | G06F 9/38 714/34 |
| 2015/0317198 | A1* | 11/2015 | Kume | G06F 12/16 714/6.11 |

FOREIGN PATENT DOCUMENTS

| | | |
|---|---|---|
| JP | 2004-078294 | 3/2004 |
| JP | 2006-180695 | 7/2006 |
| JP | 2011-090481 | 5/2011 |

OTHER PUBLICATIONS

International Search Report dated May 12, 2012 in corresponding international application PCT/JP2012/057991.

\* cited by examiner

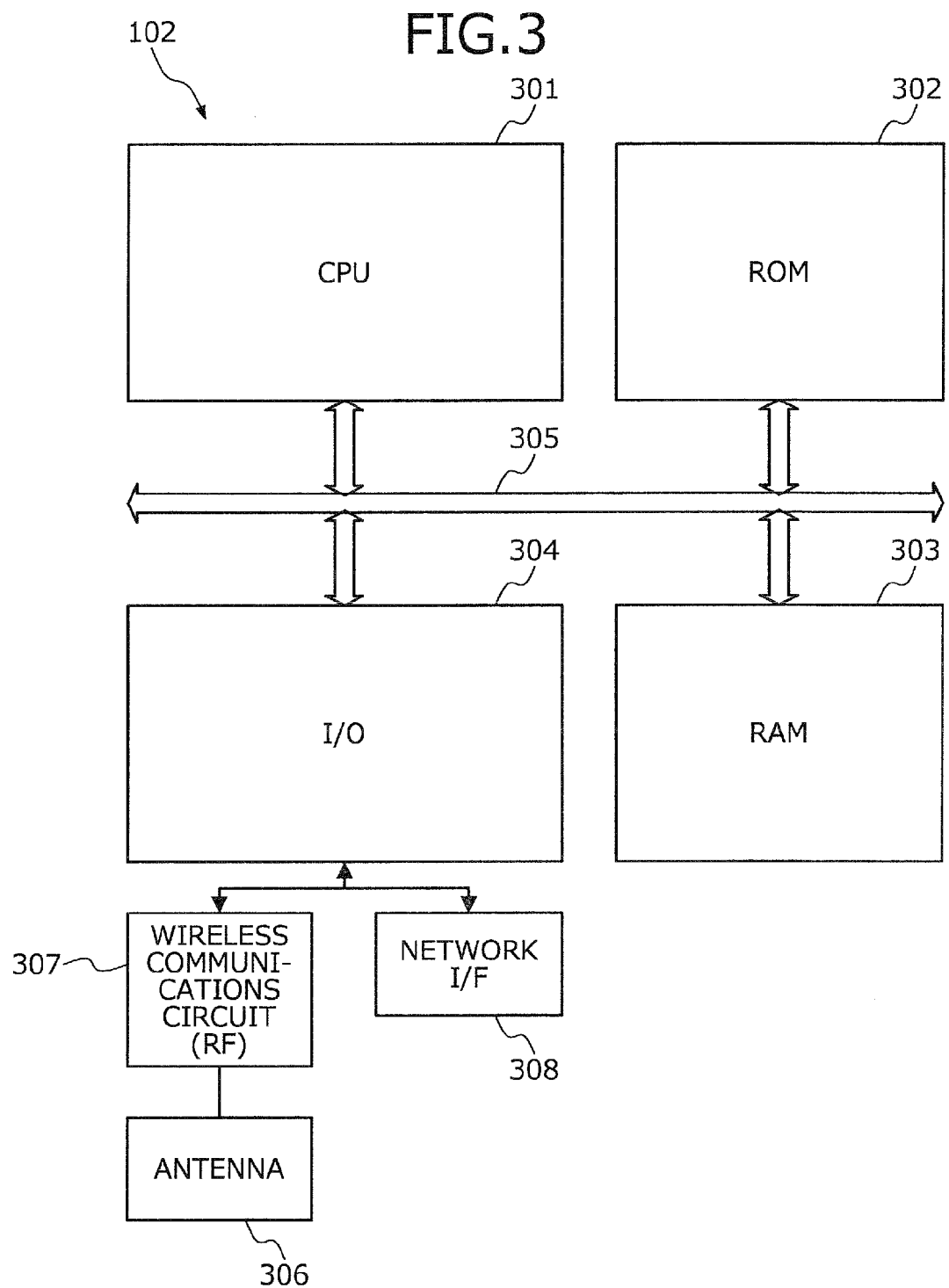

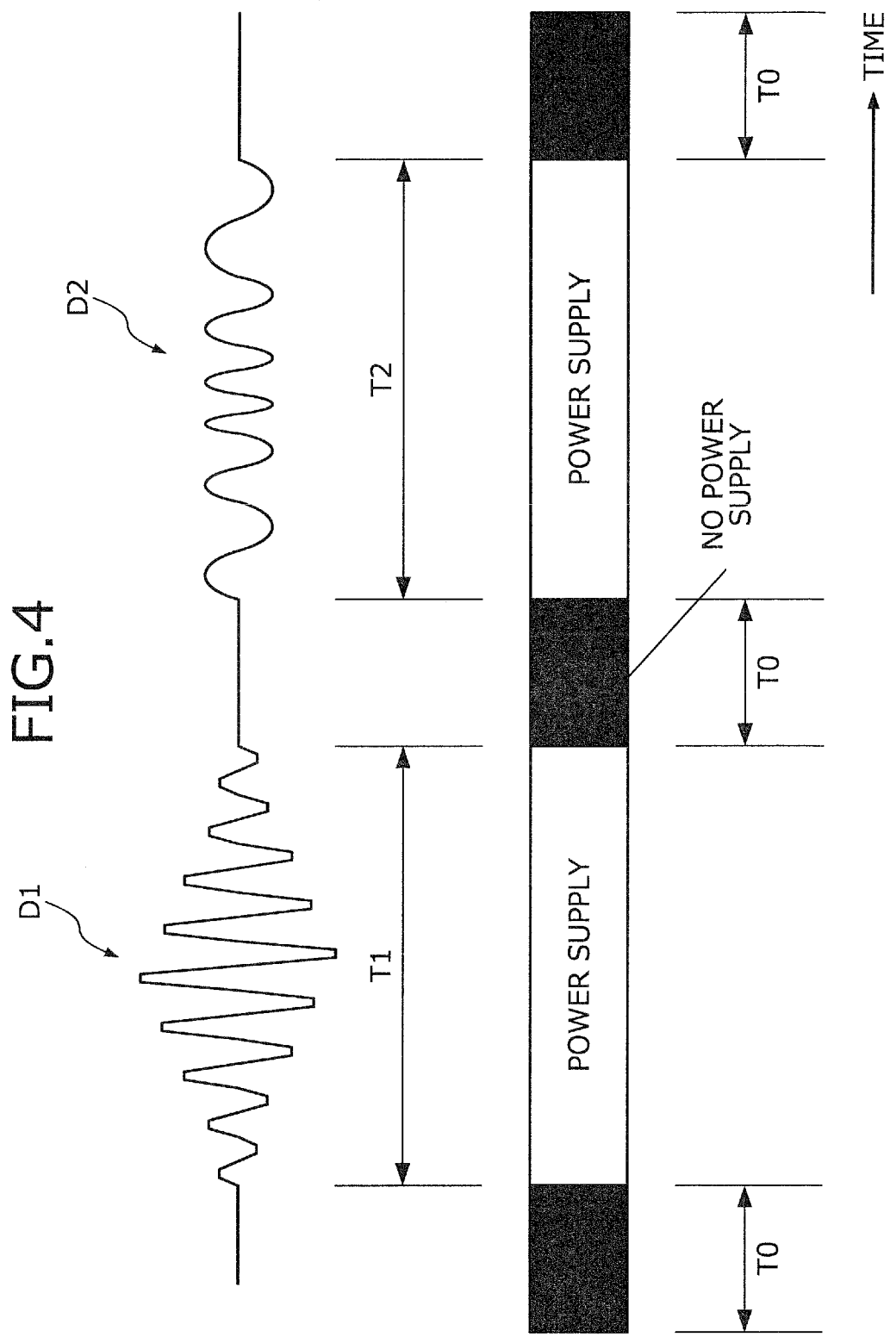

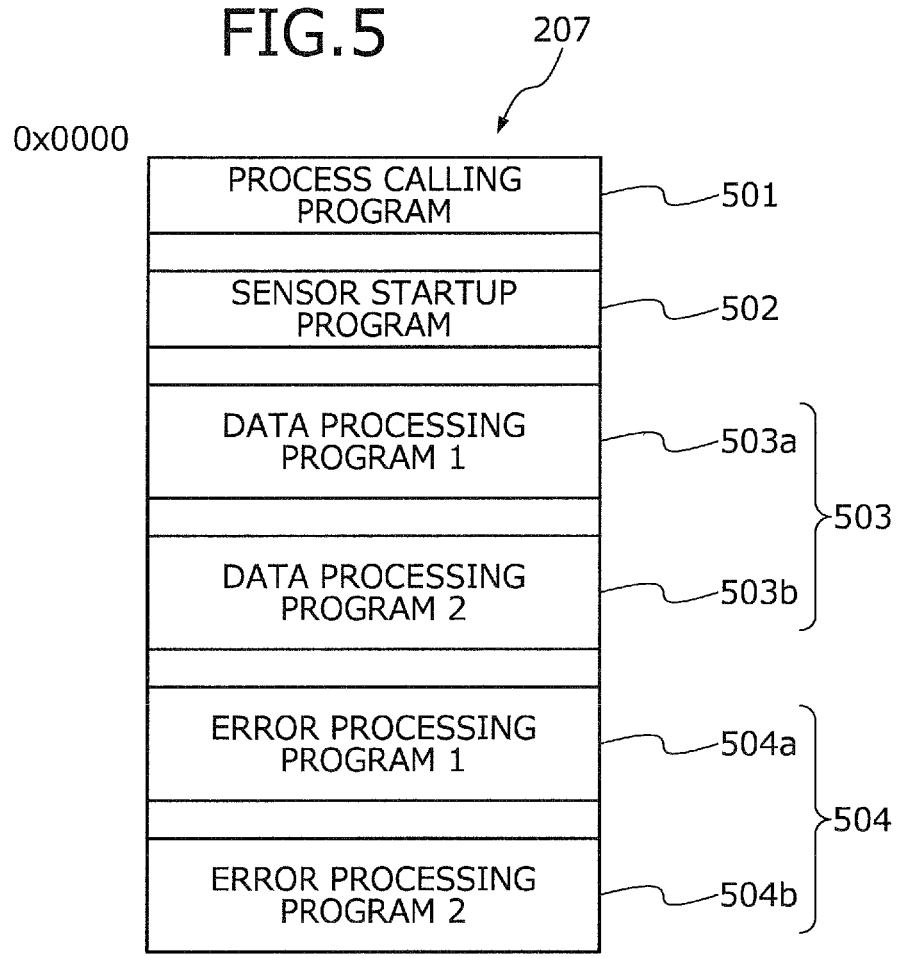

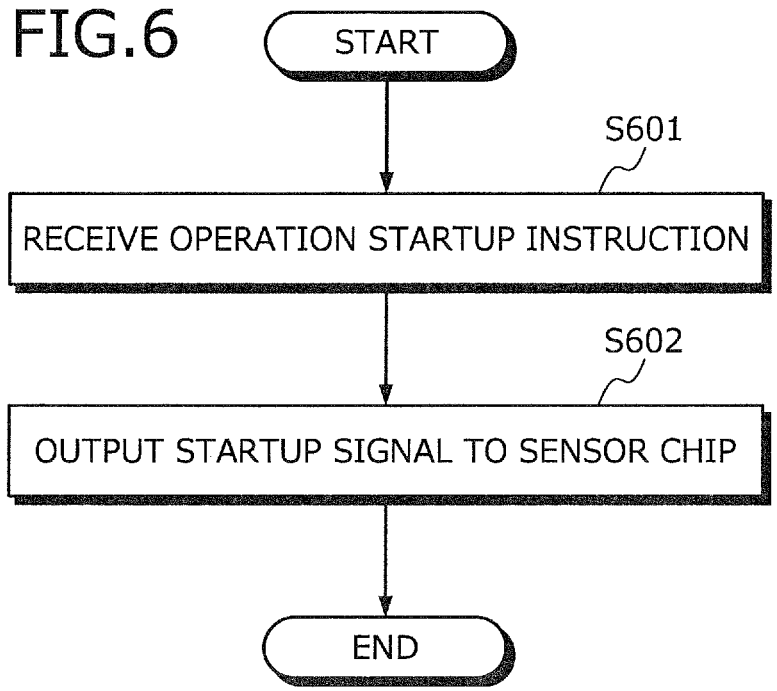
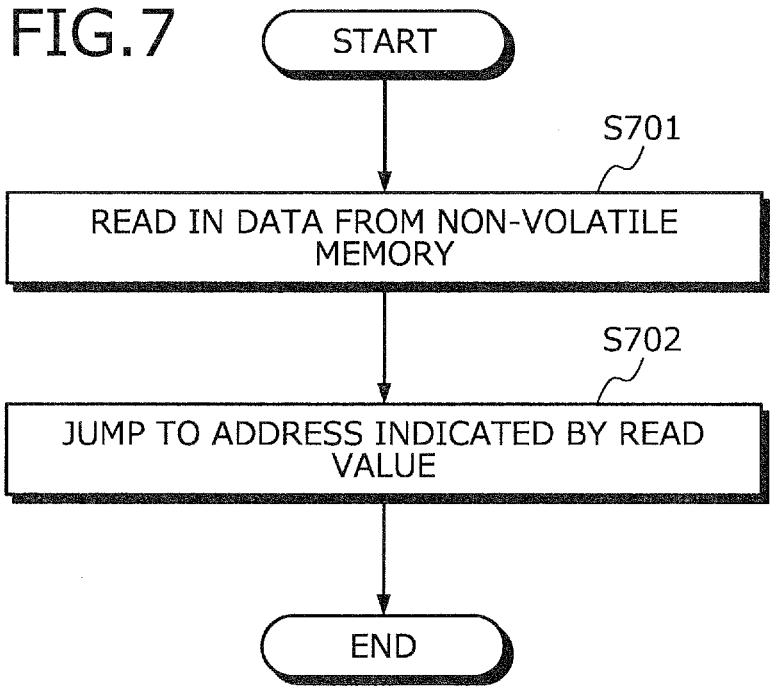

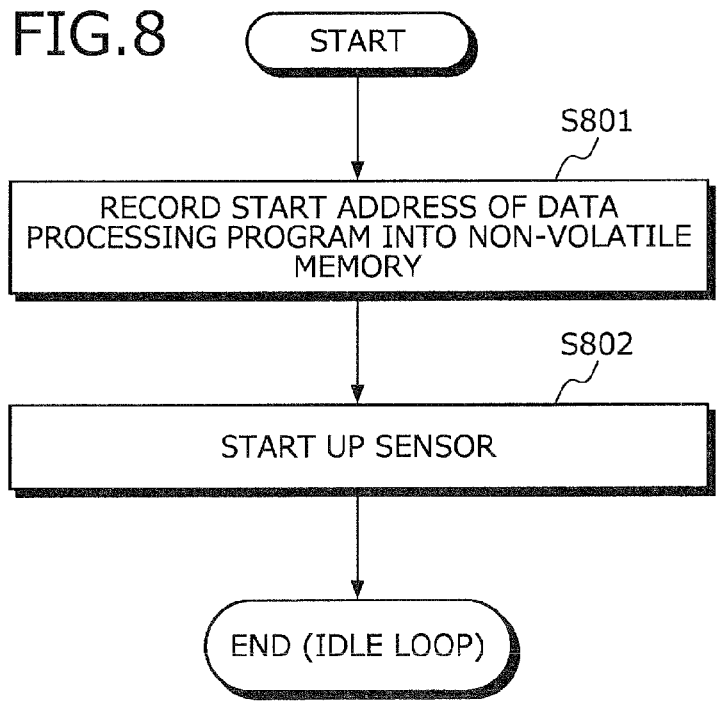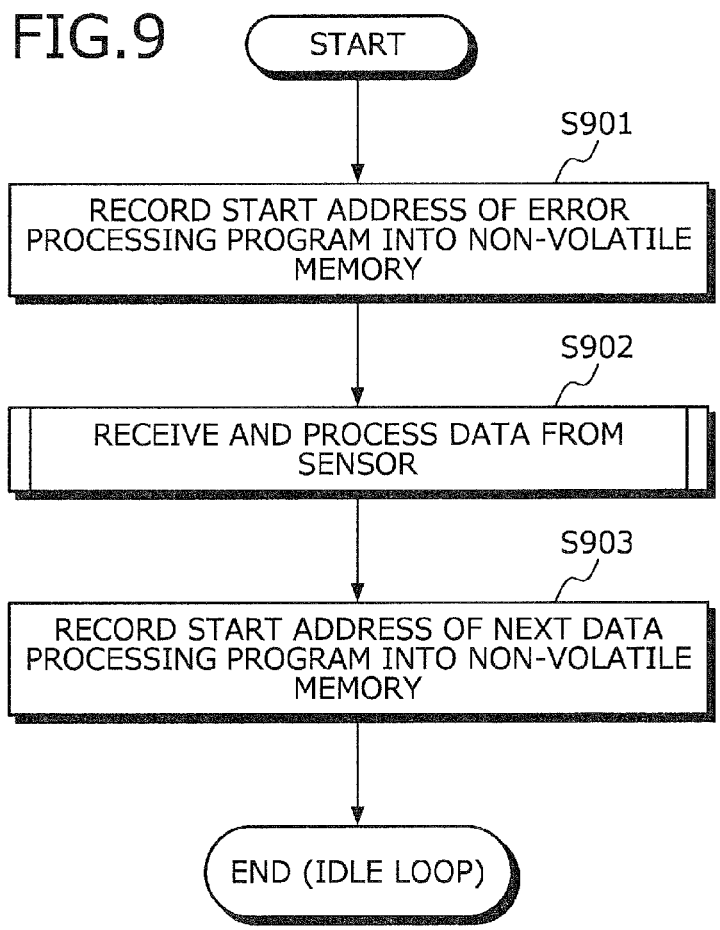

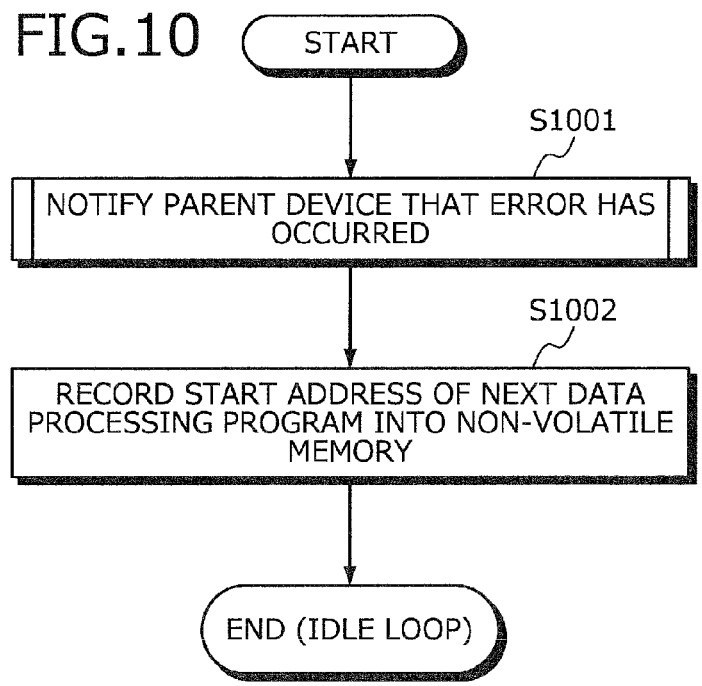
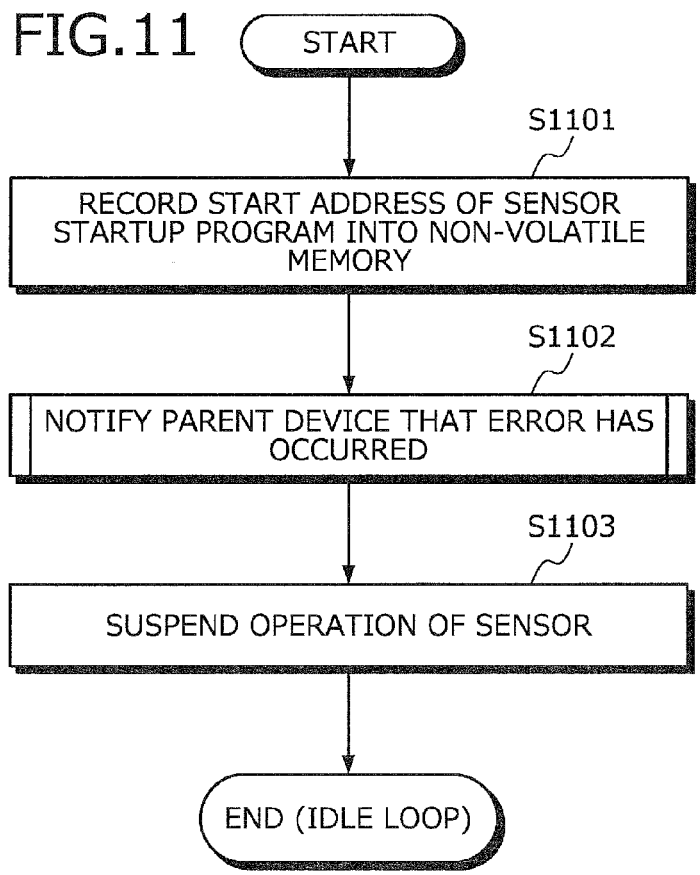

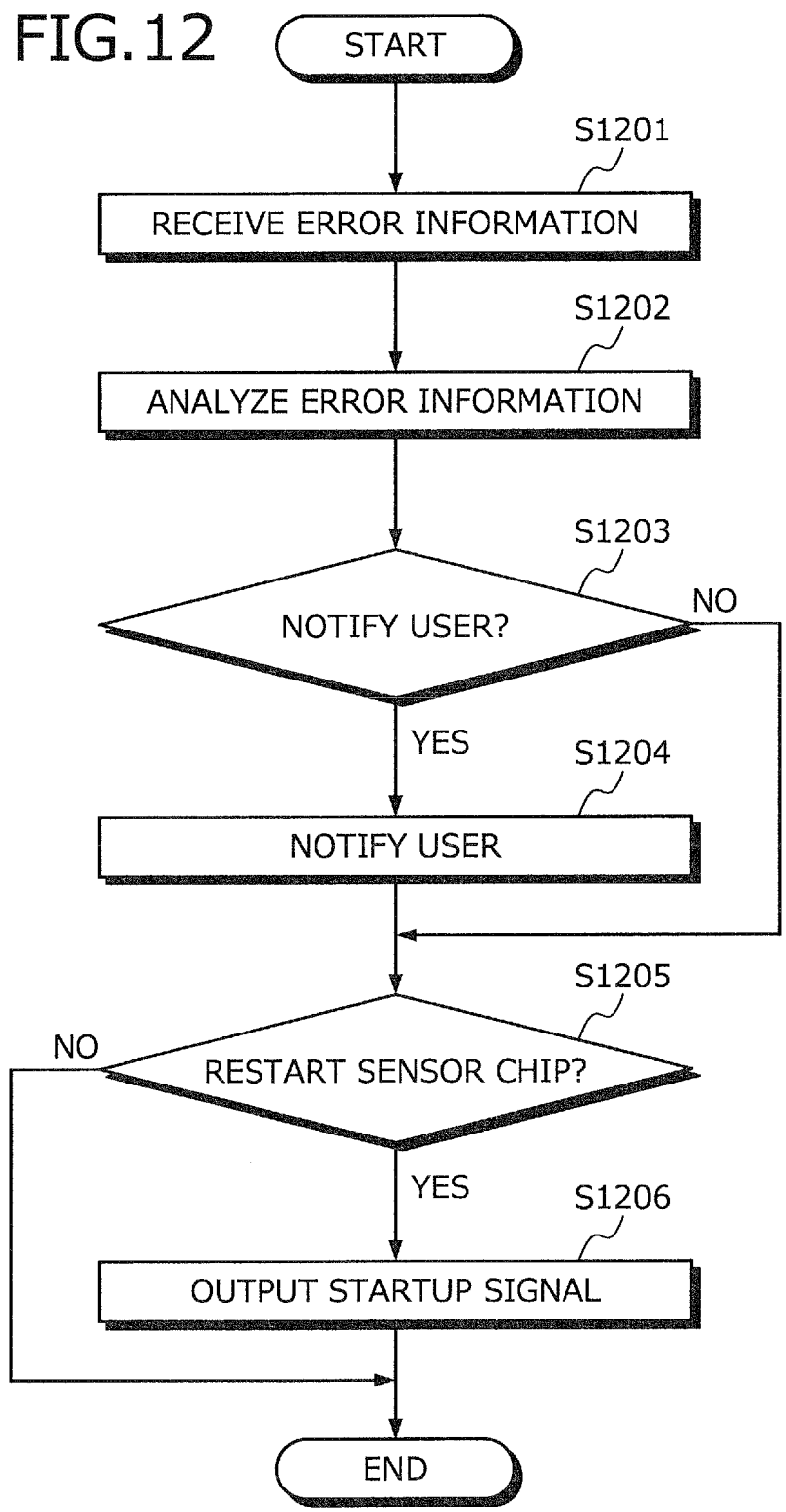

FIG.14

|  | TABLE ID0 | TABLE ID1 |
|---|---|---|
| PROCESS ID-1 (INITIAL) | 1401 START ADDRESS OF SENSOR STARTUP PROGRAM | |
| PROCESS ID0 | 1402 START ADDRESS OF DATA PROCESSING PROGRAM 1 | 1412 START ADDRESS OF ERROR PROCESSING PROGRAM 1 |
| PROCESS ID1 | 1403 START ADDRESS OF DATA PROCESSING PROGRAM 1 | 1413 START ADDRESS OF ERROR PROCESSING PROGRAM 2 |
| PROCESS ID2 | 1404 START ADDRESS OF DATA PROCESSING PROGRAM 2 | 1414 START ADDRESS OF ERROR PROCESSING PROGRAM 3 |

1305

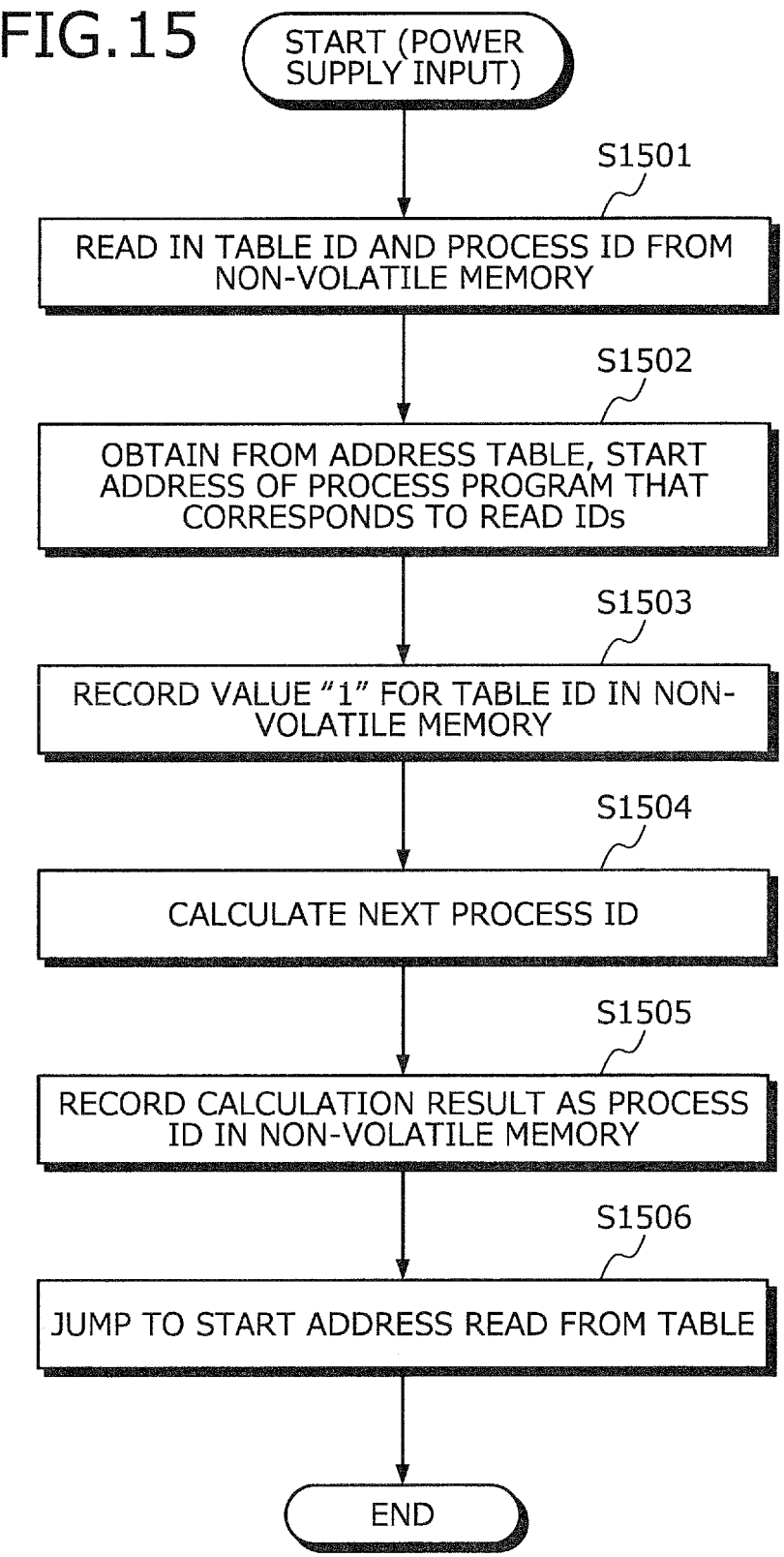

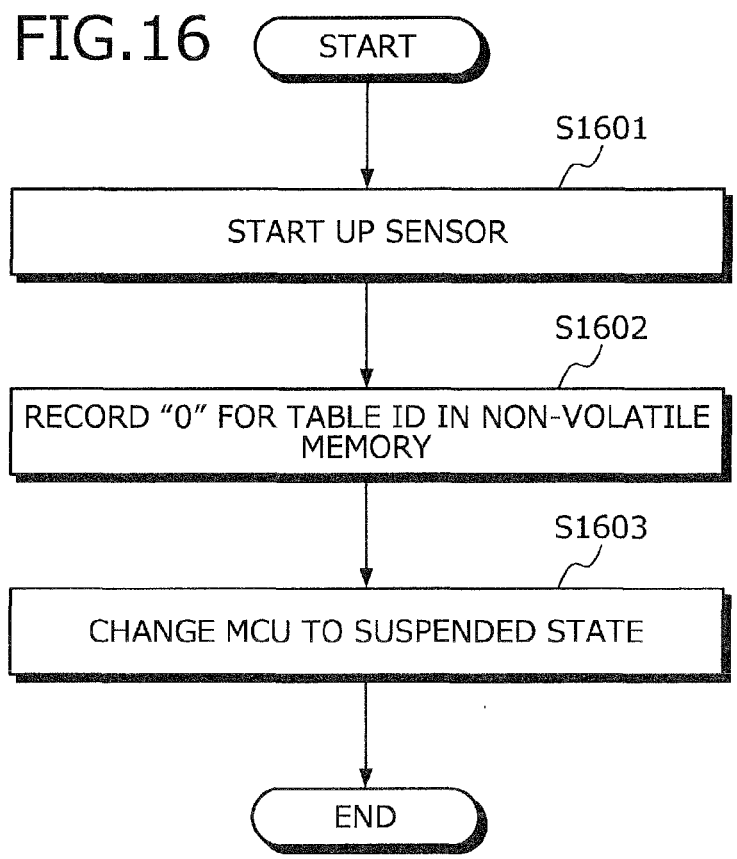
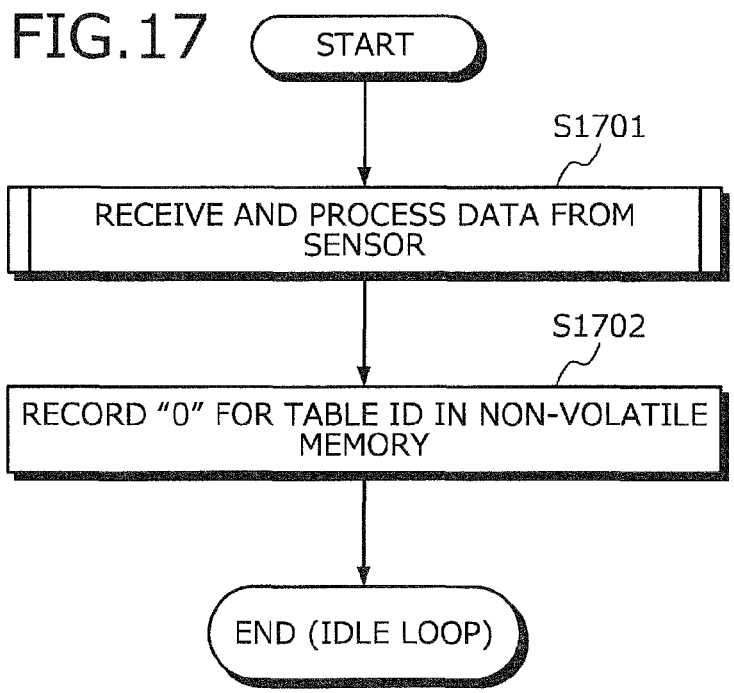

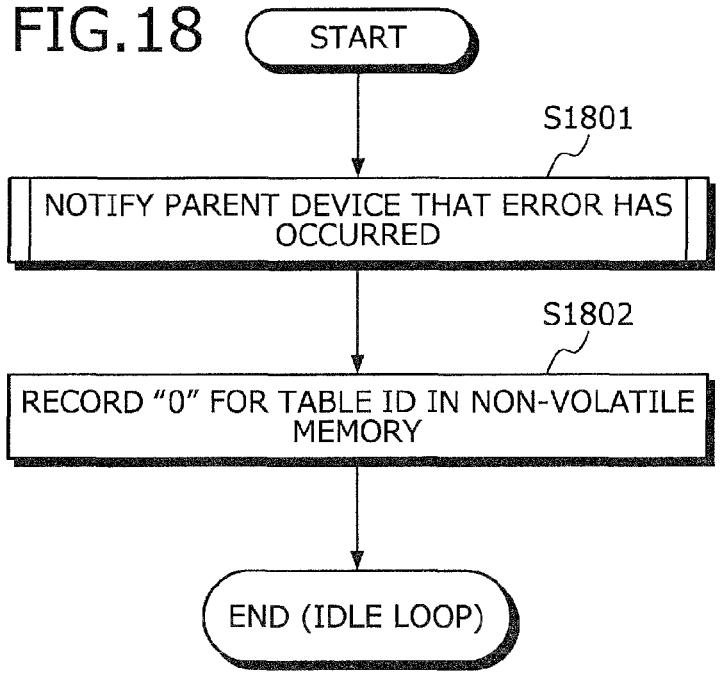
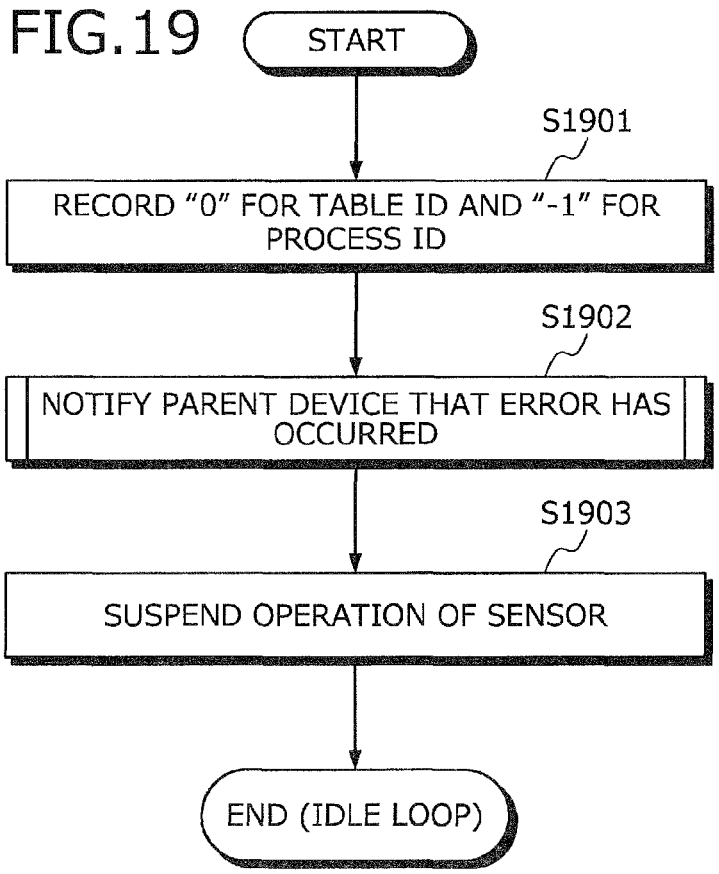

DATA PROCESSING APPARATUS AND DATA PROCESSING METHOD

CROSS REFERENCE TO RELATED APPLICATIONS

This application is a continuation application of International Application PCT/JP2012/057991, filed on Mar. 27, 2012 and designating the U.S., the entire contents of which are incorporated herein by reference.

FIELD

The embodiments discussed herein are related to a data processing apparatus and a data processing method that process data.

BACKGROUND

In a processing apparatus that executes multiple programs and processes data, the execution sequence of the programs is determined using a table. For example, according to one such processing apparatus, the addresses of the programs are stored to an address table, and a processor reads in the addresses stored in the address table and jumps to a relevant address (for example, refer to Japanese Laid-Open Patent Publication No. S60-246441). Further, another processing apparatus sets the execution sequence of processes into an address table (for example, refer to Japanese Laid-Open Patent Publication No. S53-18932).

Nonetheless, with the conventional technologies, the next process to be performed cannot be easily changed when the execution of a program is properly ended and when the execution of a program is prematurely stopped. For example, when an error occurs during the execution of a given program, as the next process, an error process corresponding to the program cannot be switched to and executed. In particular, in a case where multiple programs are sequentially switched and although an error process for each of the programs is necessary, proper ending of the programs is assumed and therefore, only the switching of programs is performed. As a result, when an error occurs during the execution of a program, the executed program cannot be handled by switching to an error processing program that should be executed next.

More specifically, in a case of a processing apparatus that cannot obtain a stable power supply, it is conceivable that execution of a program may be prematurely stopped consequent to a loss of power supply during the execution of the program. To cope with such a situation, an error process for the error that occurred has to be executed even if the processor is started up from an initialized state when the power supply is restored. However, this does not occur.

SUMMARY

According to an aspect of an embodiment, a data processing apparatus includes a storage unit configured to store plural data processing programs and a corresponding error processing program for when an error occurs with a first data processing program; and a processor configured to record to memory before executing the first data processing program, information of the error processing program that corresponds to the first data processing program; update and record in the memory after the first data processing program ends, information of a second data processing program scheduled to be executed next; and switch to any one among the first data processing program that corresponds to information recorded in the memory and the error processing program, when program processing is started next.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a block diagram of an example of an internal configuration of a parent device;

FIG. 4 is a timing chart of data detected and processed by a sensor chip;

FIG. 5 is a chart of an example of program arrangement stored in ROM of the sensor chip;

FIG. 6 is a flowchart of details of a sensor chip startup process performed by the parent device;

FIG. 7 is a flowchart of process details of a process reading program performed by the sensor chip;

FIG. 8 is a flowchart of process details of a sensor startup program performed by the sensor chip;

FIG. 9 is a flowchart of process details of a data processing program performed by the sensor chip;

FIG. 10 is a flowchart of an example of process details of an error processing program performed by the sensor chip;

FIG. 11 is a flowchart of another example of process details of an error processing program performed by the sensor chip;

FIG. 12 is a flowchart of an example of process details performed by the parent device when an error occurs;

FIG. 14 is a chart of the contents of an address table;

FIG. 15 is a flowchart of process details of a process reading program performed by the sensor chip;

FIG. 16 is a flowchart of details of a sensor startup program performed by the sensor chip;

FIG. 17 is a flowchart of process details of a data processing program performed by the sensor chip;

FIG. 18 is a flowchart of an example of process details of the error processing program performed by the sensor chip; and FIG. 19 is a flowchart of another example of the error processing program performed by the sensor chip.

DESCRIPTION OF EMBODIMENTS

Figure 1:
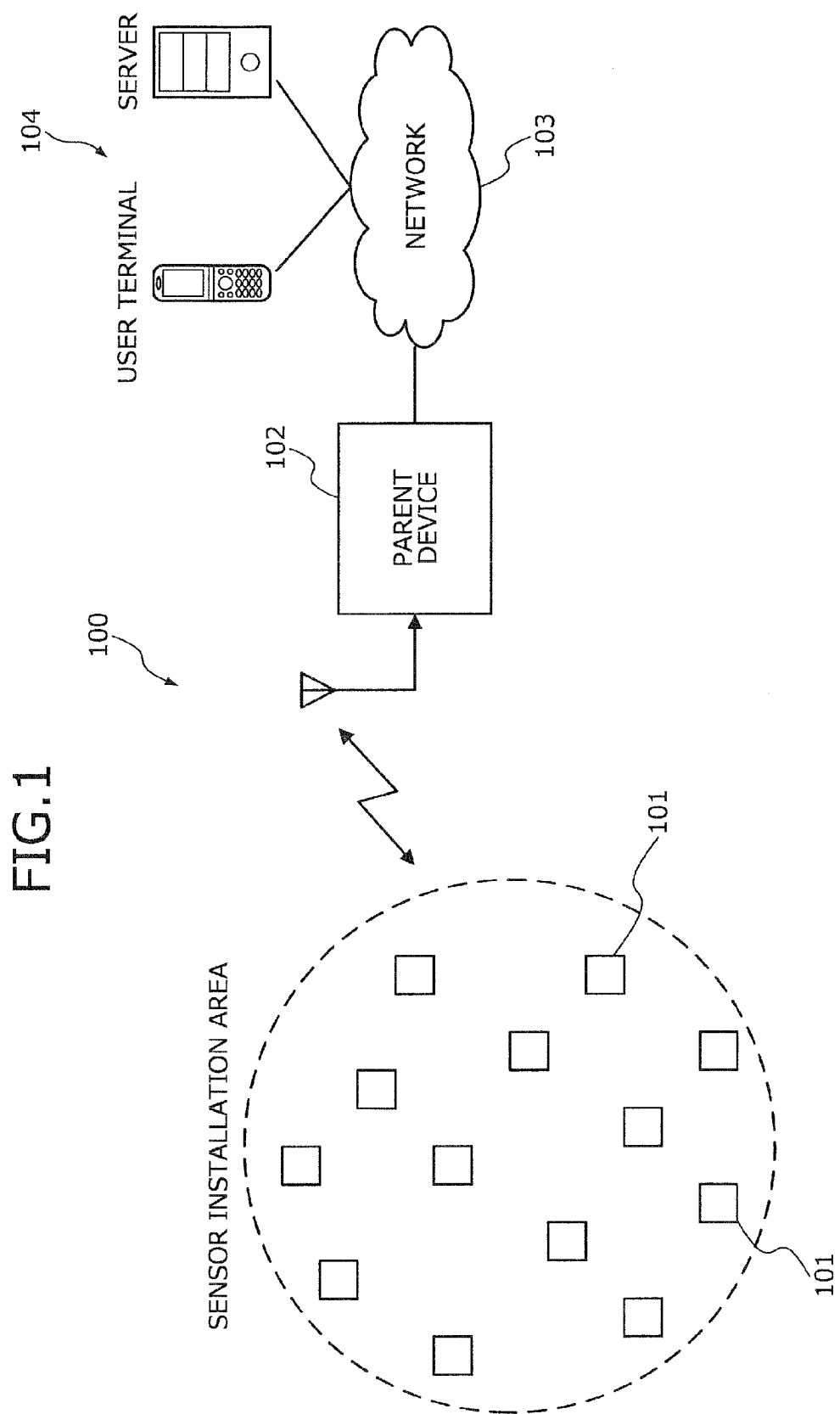
FIG. 1 is a diagram depicting a configuration example of a data processing system that includes a data processing apparatus according to a first embodiment.

Embodiments of a data processing apparatus and a data processing method will be described in detail with reference the accompanying drawings. FIG. 1 is a diagram depicting a configuration example of a data processing system that includes the data processing apparatus according to a first embodiment. A data processing system 100 depicted in FIG. 1 includes sensor chips (data processing apparatus) 101 disposed within a given installation area; a parent device 102 that receives, for example, wirelessly, sensor output from the sensor chips 101 and aggregates information; and an external apparatus 104, such as a server or user terminal that receives, through a network 103 such as the Internet, the information aggregated by the parent device 102. Each sensor chip 101 detects change at the location where the sensor chip 101 is installed and transmits detection information to the parent device 102 by wireless communication.

The parent device 102 aggregates the information obtained from the sensor chips 101 and for example, uploads the information to a server or user terminal (the external apparatus 104), or gives notification of data detected by the sensor chips 101 at the respective installation locations, etc.

Figure 2:
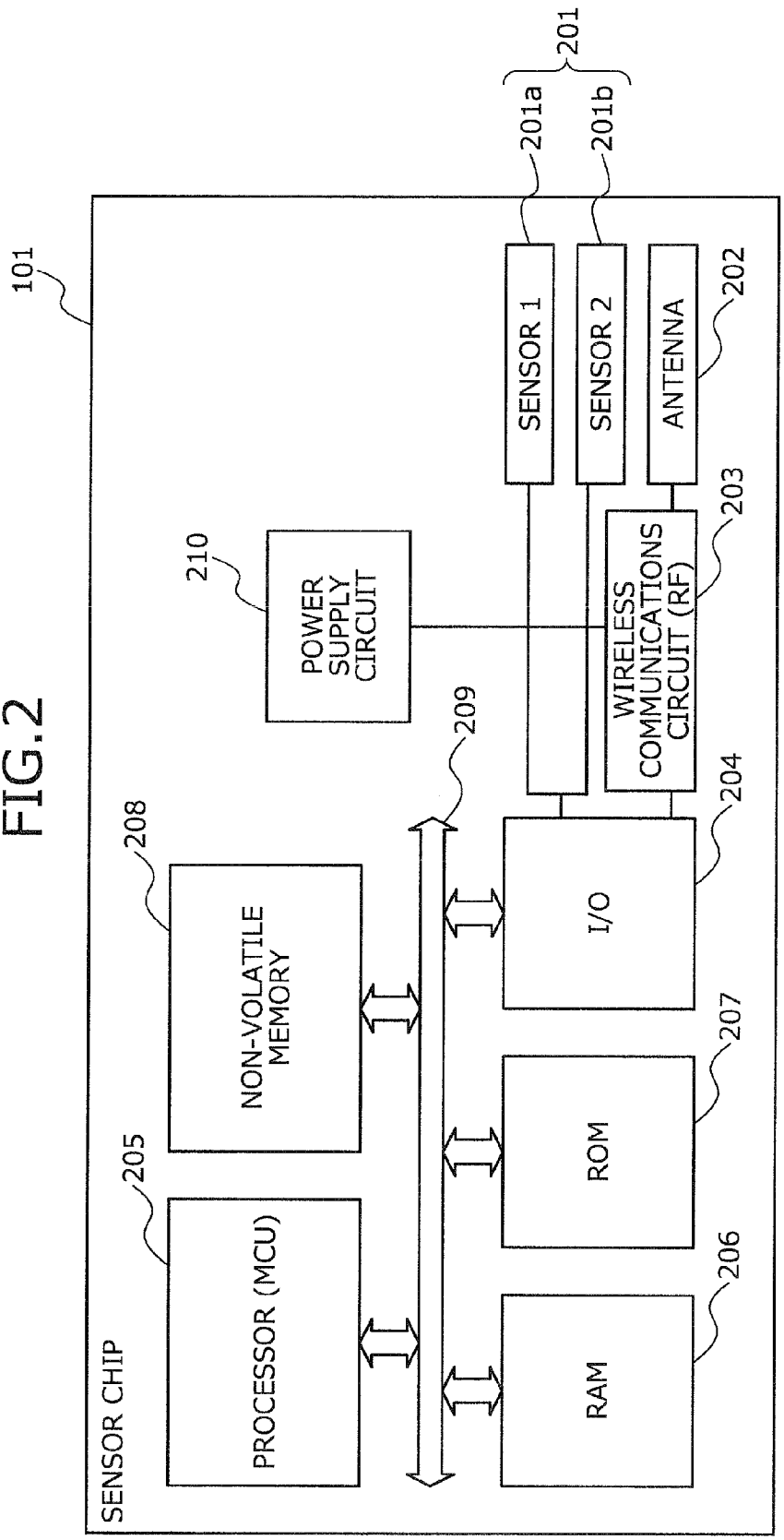
FIG. 2 is a block diagram of an example of an internal configuration of sensor chips.

FIG. 2 is a block diagram of an example of an internal configuration of the sensor chips. Each of the sensor chips 101, which is the data processing apparatus, and includes, for example, sensors 201 that generate electrical power based on the detection of pressure or light such as by a piezoelectric device or optoelectronic device. Each of the sensor chips 101 further includes an antenna 202 and a wireless communications circuit (RF) 203 for wirelessly communicating with the parent device 102, the sensor 201, and an interface (I/O) circuit 204 for converting electronic signals from the wireless communications circuit 203 into digital data. Each of the sensor chips 101 further includes a microprocessor (MCU) 205 for processing data from the sensors 201, random access memory (RAM) 206 for storing temporary data of the processing at the MCU 205, a storage unit (read-only memory (ROM)) 207 for storing process programs executed by the MCU 205, non-volatile memory 208 capable of retaining data even when the power supply is interrupted, a bus 209 connecting the I/O circuit 204 to the non-volatile memory 208, and a power supply circuit 210 that supplies driving power to the sensor chip 101.

In the example depicted in FIG. 2, the sensors 201 include sensors that measure changes (data) of different properties. For example, sensor 1 (201a) measures pressure, and sensor 2 (201b) measures temperature. The power supply circuit 210 operations each of the components of the sensor chip 101, based on the electrical power generated by the sensors 201 and/or the generation of electrical power, as electromotive force, from the wireless communications radio wave received by the antenna 202, from the parent device 102. In other words, the sensor chip 101 does not need a secondary battery or an external power source and internally generates electrical power required for operation.

FIG. 3 is a block diagram of an example of an internal configuration of the parent device. The parent device 102 operates based on a battery or external power source. The parent device 102 includes a processor (CPU) 301 whose performance is higher than that of the processor (MCU) 205 of the sensor chip 101 (CPU) 301, high-capacity ROM 302 and RAM 303, an interface (I/O) circuit 304, and a bus 305 that respectively connects the CPU 301 to the I/O circuit 304. The I/O circuit 304 is connected to an antenna 306 and wireless communications circuit (RF) 307 for wirelessly communicating with the parent device 102, and a network I/F 308. Thus, the parent device 102, through the network I/F 308, communicates with the external apparatus 104 such as the user terminal and server by a TCP/IP protocol process, via a network such as the Internet.

FIG. 4 is a timing chart of data detected and processed by a sensor chip. The horizontal axis represents time. The sensor chip 101 detects changes in different properties by the sensors 201a, 201b or by one of the sensors 201. In the case of one sensor 201, a detecting element that detects multiple changes is disposed and different changes are output from a single terminal.

As depicted in FIG. 4, sensor 1 (201a) detects data D1; and sensor 2 (201b) detects data D2. In the first embodiment, sensor 1 (201a) and sensor 2 (201b) alternately detect and output data. Thus, data D1, D2 for different properties detected by one or more of the sensors 201 are switched on a temporal basis and alternately input to the I/O circuit 304. The signal switching order is preliminarily determined. At the MCU 205, sensor-specific data processing programs are switched and executed according to a preliminarily determined sensor (detected data) sequence.

Further, as depicted in FIG. 4, the electrical power supply by sensor 1 (201a) and sensor 2 (201b) is an interval (in the drawing, power supply intervals T1, T2) during which electronic signals from sensor 1 (201a) and sensor 2 (201b) are input. Therefore, during the switching of the signals of the sensors 201 (in the drawing, no power supply interval T0), an interval occurs during which there is no electronic signal, which is the source for generating the electromotive force and therefore, power cannot be supplied to the components of the sensor chip 101.

The sensor chip 101 loses all of the information in the RAM 206 and the register of the MCU 205 when the power supply is interrupted. When the power supply is resumed, the register in the MCU 205 is initialized and the MCU 205 reads out the program from address 0 of the ROM 207 and begins to execute the program.

In the present embodiment, before starting the data processing programs, the MCU 205 stores the start addresses of error processing programs that correspond to the data processing programs that are to be executed and thereby, enables execution of an error process when the power supply interrupted. Further, when execution of the data processing programs can be completed, the MCU 205 updates the non-volatile memory 208 with the start address of the next data processing program. Here, the start address of the error processing program is erased and overwritten with the start address of the data processing programs to be executed next.

FIG. 5 is a chart of an example of program arrangement stored in the ROM of a sensor chip. As depicted in FIG. 5, a process calling program 501 is arranged at address 0 in the ROM 207 of the sensor chip 101. When power is supplied, the MCU 205 executes the process calling program 501. The process calling program 501 reads out from the non-volatile memory 208, data, i.e., the address of the program to be executed. Sensor startup programs 502, data processing programs 503, error processing programs 504, etc. are arranged at subsequent addresses in the ROM 207.

The data processing programs 503 include a data processing program 1 (503a) for processing data detected by sensor 1 (201a) and a data processing program 2 (503b) for processing data detected by sensor 2 (201b). The error processing programs 504 include an error processing program 1 (504a) for errors of the data processing program 1 (503a) for sensor 1 (201a) and an error processing program 2 (504b) for errors of the data processing program 2 (503b) for sensor 2 (201b).

When processing starts, the MCU 205 executes the process calling program 501 and thereby, reads in the address stored in the non-volatile memory 208 and jumps to the read address. Thus, during both proper operation and when an error occurs consequent to power supply interruption, by merely executing the program (the data processing program 503 or the error processing program 504) recorded to the non-volatile memory 208 at the previous session (i.e., without performing branching determination), a suitable process can be performed.

If the data processing program 503 at the previous session is executed to completion, the MCU 205 executes the data processing program 503 stored to the non-volatile memory 208 at the time of process completion at the previous session. On the other hand, if the electromotive force from the sensor 201 is insufficient, unexpected data is output from the sensor 201, etc., the MCU 205 lacks the required electrical power before the executed data processing program 503 ends and the processing of the data processing programs 50 cannot be performed to completion.

In such a case, when the data processing program 503 is started up next, the MCU 205 executes the error processing program 504 of the start address recorded in the non-volatile memory 208. As a result, even without performing a determination process by the MCU 205, the process program (the data processing program 503 or the error processing program 504) is switched according to the switching of input data and whether to switch and perform an error process according to process results can be realized. Since branching determination between proper operation and an error becomes unnecessary at the MCU 205, the processing load of the MCU 205 can be reduced, program startup can be expedited, and the capacity of the ROM 207 can be reduced.

FIG. 6 is a flowchart of details of a sensor chip startup process performed by the parent device. As depicted in FIG. 1, the sensor chips 101 are assumed to be installed in the installation area, and installation of the parent device 102 is also assumed. In this state, the user instructs the parent device 102, via the network 103, to start system operations. The CPU 301 of the parent device 102 receives the operation startup instruction via the network I/F 308 (step S601). As a result, the CPU 301 outputs a startup signal by a radio wave through the wireless communications circuit 307 and the antenna 306, to the sensor chip 101 (step S602), and ends the startup of the sensor chip 101. Although not depicted, the same startup process is performed for each of the sensor chips 101 arranged in the installation area.

Details of a process performed by the MCU 205 of the sensor chip 101 will be described. As described above, when power is supplied, the MCU 205 executes the process calling program 501 arranged at address 0 (refer to FIG. 5).

FIG. 7 is a flowchart of process details of a process reading program performed by a sensor chip. The process calling program 501 executed by the MCU 205 reads in the data recorded in the non-volatile memory 208 (step S701), jumps to the address indicated by the value of the read data (step S702), and ends the process.

In the initial state, the sensor 201 of the sensor chip 101 suspends operations and the head address of the sensor startup programs 502 for starting the sensor 201 are recorded in the non-volatile memory 208. After the sensor chips 101 are installed in the installation area, the parent device 102 sends a radio wave for startup to a sensor chip 101 (refer to FIG. 6). When the sensor chip 101 receives the radio wave from the parent device 102, via the antenna 202 and the wireless communications circuit 203, the MCU 205 starts up using the radio wave as electromotive force and the MCU 205 executes the sensor startup programs 502 by the process calling program 501.

FIG. 8 is a flowchart of process details of a sensor startup program performed by a sensor chip. The sensor startup program 502 executed by the MCU 205 records the start address of the data processing program 503 into the non-volatile memory 208 (step S801), starts up the sensor 201 (step S802), and enters an idle state. As described, when the sensor 201 is present in plural, according to a preliminarily determined sequence, for example, in a sequence of sensor 1 (201a) followed by sensor 2 (201b), the alternate output of detection signals is started. After the startup of the sensor 201, the MCU 205 is changed to a suspended state.

As described, the sequence in which the sensors 201 output data is preliminarily determined and therefore, the sensor 201 that is going to output detected data first after the startup of the sensors 201 can be preliminarily know. Consequently, the sensor startup program 502 records into the non-volatile memory 208, the start address of the data processing program 503 corresponding to the data of the sensor 201 that is first to output data. As a result, when the sensor 201 outputs data after the suspension of the MCU 205, the MCU 205 is started up by the electromotive force of the output; and the process calling program 501 at address 0 in the ROM 207 executes the data processing program 503 recorded in the non-volatile memory 208.

FIG. 9 is a flowchart of process details of a data processing program performed by a sensor chip. Description will be given using an example in which the data of two sensors 1, 2 (201a, 201b) are processed. The data processing program 1 (503a) executed by the MCU 205 records into the non-volatile memory 208, the start address of the error processing program 1 (504a) that corresponds to the data processing for sensor 1 (201a) (step S901). The MCU 205 receives the data detected by the sensor 201 and processes the data by the data processing program 1 (503a) (step S902). The MCU 205 records into the non-volatile memory 208, the start address of the data processing program 2 (503b) that corresponds to the data output from sensor 2 (201b) (step S903), enters an idle state (the MCU 205 enters the suspended state).

Details of the process performed by the data processing program 503, for example, may include comparing the detected value to a preliminarily specified value, determining whether the detected value exceeds the specified value, analyzing whether the waveform of the data indicates a predetermined pattern, etc. The data processing program 503 notifies the parent device 102 of the data results.

After the execution of the data processing program 1 (503a) for sensor 1 (201a) by the MCU 205, the electromotive force is assumed to be lost before execution of the data processing program 1 (503a) is completed. In this case, at the data input from the subsequent sensor 2 (201b), the MCU 205 executes the error processing program 1 (504a) by the process calling program 501.

Details of the process performed by the error processing program 504 differ according to the type of the sensor 201, the purpose of the data collection by the parent device 102, etc. Examples of an error process will be described with reference to FIGS. 10 and 11.

FIG. 10 is a flowchart of an example of process details of an error processing program performed by a sensor chip. In the error processing depicted in FIG. 10, the MCU 205 notifies the parent device 102 that an error has occurred in the sensor chip 101 (step S1001). The MCU 205 records into the non-volatile memory 208, the start address of the data processing program 2 (503b) that corresponds to the data of sensor 2 (201b), which is subsequent to sensor 1 (201a) at which an error occurred (step S1002), and enters an idle state. The error processing program above is assumed to continue operations of the sensor chip 101.

FIG. 11 is a flowchart of another example of process details of an error processing program performed by a sensor chip. In the error process depicted in FIG. 11, after recording the start address of the sensor startup program 502 into the non-volatile memory 208 (step S1101), the MCU 205 notifies the parent device 102 that an error has occurred (step S1102). After giving such notification, the MCU 205 suspends sensor 1 (201*a*) (step S1103), initializes the sensor chip 101, and enters an idle state. As described, when the sensor chip 101 is returned to the initial state, by again receiving a startup radio wave from the parent device 102, the sensor chip 101 can start operations from the initial state.

FIG. 12 is a flowchart of an example of process details performed by the parent device when an error occurs. When an error occurs at the sensor chip 101, the sensor chip 101 transmits error information to the parent device 102 by a radio wave. The CPU 301 of the parent device 102, upon receiving the error information (step S1201), analyzes the error information (step S1202). In the analysis of the error information, for example, the type of the sensor chip 101 at which the error occurred and the type of the error are analyzed. In addition, the time that has elapsed since the first startup when the error information is received, and the frequency of occurrence may be analyzed.

The CPU 301 determines whether to give notification of the error at the sensor chip 101 to the external apparatus 104 of the user (step S1203). If notification to the user is not necessary (step S1203: NO), the CPU 301 proceeds to step S1205. If notification to the user is a required setting (step S1203: YES), the CPU 301 notifies the external apparatus 104 of the type of the sensor chip 101 at which the error occurred and the type of error, the time that has elapsed since the first startup when the error information is received, and the frequency of occurrence, as analysis results (step S1204).

Based on the analysis results, the CPU 301 determines whether restarting of the sensor chip 101 is necessary (step S1205). If restarting of the sensor chip 101 is not necessary (step S1205: NO), the CPU 301 ends the process. If restarting of the sensor chip 101 is necessary (step S1205: YES), the CPU 301 of the parent device 102 outputs a startup signal to the sensor chip 101 (step S1206), and ends the process. The sensor chip 101, by receiving the startup signal from the parent device 102, enters the initial state and is able to start operations from the initial state.

According to the first embodiment described above, at each program execution, the sensor chip 101 records the start address of subsequent process program into the non-volatile memory 208. At the start of execution of the data processing program 503, the start address of the error processing program 504 is recorded into the non-volatile memory 208; and after the execution of the data processing program 503, start address of the next data processing program 503 is recorded. As a result, if an error occurs and the process of the data processing program 503 can be performed to completion, the error processing program 504 can be started up at the next session and an error process corresponding to the error can be performed.

Further, when the data processing program 503 is properly ended, the next data processing program 503 is specified and the execution thereof can be started and according to whether the process of the data processing program 503 is properly ended, transition to the next data processing program 503 can be performed simply. When the execution of a process program starts, the processor (MCU) 205 reads out the start address recorded in the non-volatile memory 208 and executes the process program that corresponds to this start address. Therefore, according to the first embodiment, when a process is properly ended and when a process is prematurely ended, the determination of process switching becomes simple. In particular, branching determination of whether the execution of process programs by the processor 205 is properly performed or an error occurs becomes unnecessary.

Further, the sensor chip 101 operates by the electromotive force at the time of detection by the sensor 201 and therefore, the electrical power may be lost during execution of the program consequent to fluctuation in the electromotive force. Therefore, at the start of execution of the process programs, the start address of the next process program is recorded into the non-volatile memory 208. As a result, even if the electromotive force of the sensor chip 101 is lost and the processor 205 is initialized by restoration of the power supply, the process program that is to be started next can be clearly specified. Further, when a process is properly ended and when a process is prematurely ended, the determination of process switching can be simplified.

Even when the detection of different properties is performed by the sensors 201 disposed on a single sensor chip 101 and multiple detection-specific data processing programs 503 are executed, switching to the program of the process required next can be executed by a simple process and process programs that are prematurely ended can be coped with.

Further, in the example described in the first embodiment, although a configuration is described in which the two sensors 201*a*, 201*b* detect data of differing properties and the two corresponding data processing programs 503*a*, 503*b* are alternately executed, the detected data is not limited to these two types and may be the data of three or more differing properties. The data processing programs 503 corresponding to these three or more types of data can be similarly executed sequentially. For example, in the case of three sensors 201, configuration may be such that data is sequentially output in the sequence of sensor 1→sensor 2→sensor 3→sensor 1→sensor 2→sensor 3 . . . , and according to this sequence, the three data processing programs 503 are sequentially executed. According to the first embodiment, the data processing programs 503 can be sequentially executed by a simple process and error processes corresponding to the data processing programs 503 can be executed.

In the first embodiment, since processes can be switched without using a branching command, the determination of program switching at the processor (MCU) 205 can be performed more quickly. Further, the circuit scale of processor (MCU) 205 can be reduced by the portion that would be used for branching command processing.

According to the first embodiment, external power supply is not necessary, and even with a such data processing apparatus where the sensor chip generates electromotive force based on sensor detection and antenna reception, a loss of electrical power during program execution can be coped with and the error processing program 504 corresponding to the executed data processing programs 503 can be started up at the next session. Thus, even with a data processing apparatus of a structure that cannot secure a stable power supply, when an error occurs, a corresponding error process can be executed. As a result, the data processing system 100 that includes the data processing apparatus (sensor chip) 101 can cope overall with errors that occur and on the parent device 102 side as well, processes suitable for proper operation and when an error occurs can be clearly separated. In the description above, although an error has been described to occur when the electromotive force drops, an error may occur when the sensor 201 receives unexpected data and in this case as well, the necessary error process can be similarly executed.

In the first embodiment, the sequence of data output from the sensors 201 is determined, and during one cycle of the output sequence, any one of the sensors 201 outputs data once. Further, for each of the data processing programs 503, the data processing program 503 to be executed subsequently is unique. In a second embodiment, as an example, during one cycle of the output sequence, in the sequence of sensor 1→sensor 1→sensor 2, i.e., after two successive outputs of data by sensor 1 (201a), sensor 2 (201b) outputs data. Assuming that based on the description in the first embodiment, when a configuration is to output data two successive times from a single sensor, in the same cycle, at the first data output by sensor 1 and at the second data output by sensor 1, the data processing programs 503 have to be separately prepared causing efficiency to become poor. The second embodiment copes with such a configuration, where in the same cycle, a data processing program 503 is successively executed.

In the second embodiment, the configurations of the overall system, the sensor chips, and the parent device can be implemented by the configurations thereof in the first embodiment.

Figure 13:
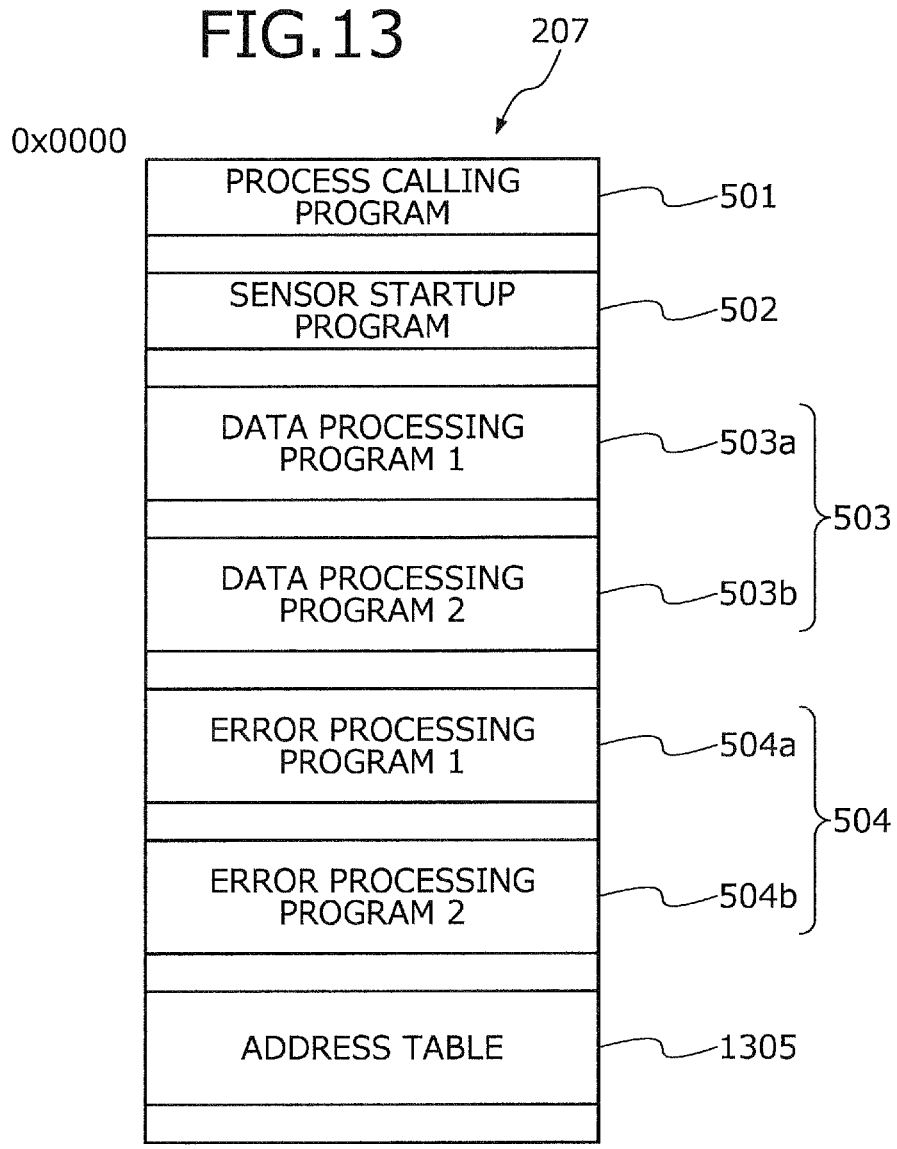
FIG. 13 is a chart depicting an example of program arrangement stored in the ROM of the sensor chip according to a second embodiment.

FIG. 13 is a chart depicting an example of program arrangement stored in the ROM of the sensor chip according to the second embodiment. Similar to the first embodiment, in the ROM 207, the process calling program 501 is arranged at address 0. The MCU 205 executes the process calling program 501 when power is supplied. The process calling program 501 reads out from the non-volatile memory 208, data, i.e., the address of the program to be executed. At subsequent addresses of the ROM 207, the sensor startup programs 502, the data processing programs 503, the error processing programs 504, etc. are arranged as programs to be executed. In the second embodiment, an address table 1305 is further arranged in the ROM 207. The address table 1305 is read out when the process reading program 501 is executed.

FIG. 14 is a chart of the contents of the address table. The address table 1305 stores the start addresses of the data processing programs 503 and the error processing programs 504 in a two-dimensional array. As depicted in FIG. 14, the address table 1305 stores process IDs according to table IDs; and the MCU 205 refers to the entry identified by the table ID and process ID to obtain the start address of a given program.

The MCU 205 reads out indices of process IDs according to the processing sequence and incrementing by one. "−1" indicates the initial state; in one cycle of the data output sequence, "0" is read out first, "1" is read out second; and "2" is read out third. In the example depicted in FIG. 14, in one cycle, the start addresses of three data processing programs 1 to 3 corresponding to three data outputs are recorded; and when the number of data outputs is large, the number of process IDs set is increased according to the data output count.

Table ID0 is usually read out and table ID1 is read out when an error has occurred. In describing the process IDs in terms of processing sequence, the process ID is −1 at the initial state, in table ID0 in which the process ID is −1, the start address 1401 of the sensor startup program 502 is recorded, and since no error has occurred at the initial state, the column of table ID1 where the process ID is −1 is empty.

In table ID0 in which the next process ID is 0, the start address 1402 of the data processing program 1 is recorded. In table ID1, the start address 1412 of the error processing program 1 that corresponds to the data processing program 1 in the case of an error is recorded. In table ID0 in which the next process ID is 1, the start address of the data processing program 11403 that is to be executed again is recorded. In table ID1, the start address 1413 of the error processing program 2 (rather than the error processing program 1, the error processing program 2 is set as the error processing program that corresponds to the data processing program 1 in the case of an error in the second execution). In table ID0 in which the next process ID is 2, the start address 1404 of the data processing program 2 is recorded. In table ID1, the start address 1414 of error processing programs 3 that corresponds to the data processing program 2 in the case of an error is recorded.

Further, in the non-volatile memory 208, data of process IDs and table IDs are updated and recorded. At the initial state, in the non-volatile memory 208, the value of process ID is −1 and the value of the table ID is 0.

FIG. 15 is a flowchart of process details of the process reading program performed by the sensor chip. When power is supplied to the sensor chip 101, the MCU 205 executes the process calling program 501 stored at address 0 of the ROM 207. The process calling program 501 reads in the table ID and the process ID recorded in the non-volatile memory 208 (step S1501). The MCU 205 obtains from the address table 1305 in the ROM 207, the start address of the process program that corresponds to the read table ID and process ID (step S1502).

The MCU 205 records the value "1" for the table ID in the non-volatile memory 208 in the case of an error (step S1503). As described in the first embodiment, setting table ID=1 is performed as a countermeasure for an error occurring during execution of a process program.

The MCU 205 calculates the next process ID (step S1504). The next process ID is obtained by adding 1 to the current process ID, dividing the sum by the process count for one cycle, and taking the remainder. The MCU 205 records the next process ID into the non-volatile memory 208 (step S1505). After making the recording to the non-volatile memory 208, the MCU 205 jumps to the start address of the program read out from the address table 1305 (step S1506), and executes the program at the read out start address. Hereafter, the MCU 205 continually performs the operation at step S1501 and thereafter.

More specifically, process ID execution sequence will be described. In the initial state, as depicted in FIG. 14, since the process ID is "−1", when the sensor chip 101 receives an startup radio wave from the parent device 102, the MCU 205 executes the process calling program 501; and the process calling program 501 executes the sensor startup program 502. Here, the process ID is updated to "0".

FIG. 16 is a flowchart of details of the sensor startup program performed by the sensor chip. The sensor startup program 502 begins operation of the sensor 201 (step S1601), records "0" for the table ID in the non-volatile memory 208 (step S1602), changes the MCU 205 to the suspended state (step S1603), and enters an idle state.

The sensor 201 begins operation and when the MCU 205 is activated by electrical power from the sensor 201, next the data processing program 1 (1402 in FIG. 14) recorded at a corresponding location (table ID=0, process ID=0) in the address table 1305 is executed since both the table ID and the process ID are both "0" in the non-volatile memory 208.

FIG. 17 is a flowchart of process details of the data processing program performed by the sensor chip. The data processing program 503 causes the MCU 205 to receive data from the sensor 201 and to process the data (step S1701). The MCU 205 records "0" for the table ID in the non-volatile memory 208 (step S1702), and the MCU 205 is suspended. With each execution of the data processing program 503, the process ID is updated by the process calling program 501 in the sequence of 0→1→2 and by calculating the remainder as above, when process ID reaches the process count for one cycle, the value returns to 0 and the operations are repeatedly performed. In the example depicted in FIG. 14, the data processing programs 503 are executed in the sequence of the data processing program 1 (503*a*)→the data processing program 1 (503*a*)→the data processing program 2 (503*b*).

The table ID is set to "0" when the data processing program 503 has been executed to the end. On the other hand, if electrical power is lost during the execution of the data processing program 503, the value "1" set by the process calling program 501 is left as is. At the next startup of the MCU 205, the error processing programs 504 that corresponds to the process ID is executed. For example, in the example depicted in FIG. 14, if the electrical power is lost during execution of the data processing program 1 (503*a*), at the next startup of the MCU 205, the MCU 205 executes the error processing program 1 (504*a*) that corresponds to the data processing program 1 (503*a*).

FIG. 18 is a flowchart of an example of process details of the error processing program performed by the sensor chip. The error processing program 504, for example, causes the MCU 205 to notify the parent device 102 that an error has occurred (step S1801), records "0" as the table ID in the non-volatile memory 208 (step S1802), and continues operation of the sensor chip 101 of the sensor 201 at which the error occurred.

FIG. 19 is a flowchart of another example of the error processing program performed by the sensor chip. In the error process depicted in FIG. 19, the MCU 205 records "0" as the table ID in the non-volatile memory 208, records "−1" for the process ID, and then initializes the table ID and the process ID (step S1901). The MCU 205 notifies the parent device 102 of the occurrence of an error (step S1902), and suspends operation of the sensor 201 (step S1903). Thus, when the sensor chip 101 is returned to the initial state, the sensor chip 101 again receives a startup radio wave from the parent device 102, enabling operation to start from the initial state.

Further, concerning the process performed on the parent device 102 in the case of an error, as described in the first embodiment (FIG. 12), when error information is received from the sensor chip 101, the error information is analyzed, and the external apparatus 104 of the user is notified of the error occurring at the sensor chip 101. Based on the analysis results, whether the sensor chip 101 has to be restarted is determined and if not, the error process ends. If the sensor chip 101 has to be restarted, a startup signal is output to the sensor chip 101. The sensor chip 101 enters the initial state consequent to receiving the startup signal from the parent device 102, enabling operation to begin from the initial state.

According to the second embodiment, the same effects as those of the first embodiment are achieved an even for a configuration that cannot secure a stable power supply, when an error occurs, a corresponding error process can be executed. In addition, in the second embodiment, by a setting of the address table, when the same sensor outputs data multiple times during one cycle, setting can be performed by referring to the same data processing program. Further, a corresponding error processing program is correlated with each data processing program. As a result, if one sensor outputs data multiple times during one cycle, data processing programs of the same contents need not be respectively prepared in the ROM 207, enabling a reduction of the amount of memory occupied by programs arranged on the ROM 207, etc. and efficient switching of programs.

According to one aspect of the embodiments, the next process to be performed can be easily switched according to whether program processing is properly ended.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data processing apparatus comprising:
a storage configured to store a plurality of data processing programs and an error processing program corresponding to a first data processing program among the plurality of data processing programs, for when an error occurs with the first data processing program; and
a processor configured to:
record to a memory before executing the first data processing program, information of the error processing program that corresponds to the first data processing program,
update and record in the memory after executing of the first data processing program ends, information of a second data processing program scheduled to be executed next, the second data processing program being among the plurality of data processing programs, and
switch to any one among the second data processing program and the error processing program based on the information recorded in the memory, when program processing is next started.

2. The data processing apparatus according to claim 1, wherein the memory is non-volatile memory.

3. The data processing apparatus according to claim 1, further comprising:
one or more sensors configured to detect differing changes, wherein
an output sequence of the one or more sensors is predetermined, and
the processor switches and executes data processing programs among the plurality of data processing programs corresponding to the differing changes input at different timings.

4. The data processing apparatus according to claim 1, wherein the processor:
records to the memory, a start address of any one among the second data processing program and the error processing program, and
reads in when the program processing is started next, the start address recorded in the memory, jumps to the start address in the storage, and switches to and executes any one of the second data processing program and the error processing program.

5. The data processing apparatus according to claim 1, wherein the processor notifies, by communication, an external apparatus of an occurrence of the error when the error processing program is executed.

6. The data processing apparatus according to claim 1, wherein the processor initializes a state thereof and suspends operation, when the error processing program is executed.

7. The data processing apparatus according to claim 1, further comprising:
a power supply configured to generate electrical power based on an electromotive force when change is detected by a sensor,
wherein the data processing apparatus operates based on the electrical power generated by the power supply.

8. The data processing apparatus according to claim 7, wherein the power supply generates electrical power based on the electromotive force when the data processing apparatus communicates with an external apparatus.

9. The data processing apparatus according to claim 1, wherein
the storage is further configured to store an address table that sets a processing sequence and stores as a two-dimensional array, start addresses of the plurality of data processing programs and that of a corresponding error processing program,
the address table is configured to store in entries differing in processing sequence, a start address of a same or a differing data processing program, and
the processor, with regard to the processing sequence in the address table, when a start address for a previous session and a start address for a subsequent session are identical, is configured to read from the storage and successively execute the second data processing program.

10. The data processing apparatus according to claim 9, wherein
the address table is set to have one cycle of an execution sequence of the plurality of data processing programs, and
the processor returns, after completion of a last data processing program of the one cycle, a start address of a data processing program set as an initializing process, to continuously execute the plurality of data processing programs over a plurality of cycles.

11. A data processing method comprising:
recording to a memory by a processor before execution of any of a plurality of data processing programs begins, information of an error processing program that corresponds to a first data processing program among the plurality of data processing programs;
updating and recording in the memory by the processor after execution of the first data processing program ends, information of a second data processing program scheduled to be executed next, the second data processing program being among the plurality of data processing programs; and
switching, by the processor, to any one among the second data processing program and the error processing program based on the information recorded in the memory, when program processing is next started by the processor.

12. The data processing method according to claim 11, wherein the memory is non-volatile memory.

* * * * *